Patented June 30, 1931

1,812,345

UNITED STATES PATENT OFFICE

HANS KRZIKALLA, OF MANNHEIM, AND FRANZ BLUEMMEL, OF SECKENHEIM, GERMANY, ASSIGNORS TO GENERAL ANILINE WORKS, INC., OF NEW YORK, N. Y., A CORPORATION OF DELAWARE

COMPLEX CHROMIUM COMPOUNDS OF AZO DYESTUFFS

No Drawing. Application filed November 30, 1928, Serial No. 322,960, and in Germany December 1, 1927.

The present invention relates to the production of complex chromium compounds of o-hydroxyazo dyestuffs.

We have found that new dyestuffs are obtained by treating the o-hydroxyazo dyestuffs obtainable from diazotized o-aminophenols or their derivatives and β-diketones of the general formula:—

in which R and R' may be the same or different alkyl-, aralkyl-, or aryl radicles, with chromium compounds capable of forming complex compounds with azo dyestuffs. The treatment may be carried out for instance by boiling or heating under pressure an aqueous solution of the dyestuff and the chromium compound.

The resulting dyestuffs may be applied for a great variety of purposes, such as dyeing wool and leather, or for making lakes or colored lacquers or varnishes, and are distinguished by their excellent properties as regards fastness.

The following examples will further illustrate the nature of the said invention which however is not limited thereto. The parts are by weight.

Example 1

37.6 parts of the azo dyestuff obtainable from diazotized 4-nitro-2-aminophenol-6-sulfonic acid and acetylacetone are boiled in an aqueous solution with 14 parts of chromium fluorid for several hours under a reflux condenser. The dyestuff obtained on salting out is very strong and gives very fast, handsome and particularly even yellow dyeings, with a reddish tinge, on wool.

The dyestuff can also be prepared with the aid of chromium formate.

A similarly prepared chromium compound of the dyestuff obtainable from diazotized 4-chlor-2-aminophenol-6-sulfonic acid and acetylacetone gives redder dyeings on wool and this is also the case with the chromium compound of the azo dyestuff obtainable from the nitrated diazo compound of 1-amino-2-naphthol-4-sulfonic acid and acetylacetone.

Example 2

43 parts of the o-hydroxyazo dyestuff obtainable from diazotized 1-amino-2-naphthol-4-sulfonic acid and benzoylacetone are boiled for about 2 hours with 16 parts of chromium fluorid and 500 parts of water, the chromium compound of the dyestuff being then salted out. The resulting chromiferous dyestuff gives fast and very even red violet dyeings on wool. The chromium compound of the corresponding dyestuff obtainable from the nitrated diazo compound of 1-amino-2-naphthol-4-sulfonic acid gives redder shades.

What we claim is:—

As a new article of manufacture the complex chromium compound of the o-hydroxyazo dyestuff obtainable by coupling diazotized 4-nitro-2-aminophenol-6-sulfonic acid and acetylacetone, dyeing wool yellow shades with a reddish tinge.

In testimony whereof we have hereunto set our hands.

HANS KRZIKALLA.
FRANZ BLUEMMEL.